T. H. M. CRAMPTON.
TRIANGLE COMPUTING AND DRAFTING INSTRUMENT.
APPLICATION FILED JULY 5, 1917.
1,262,023.
Patented Apr. 9, 1918.
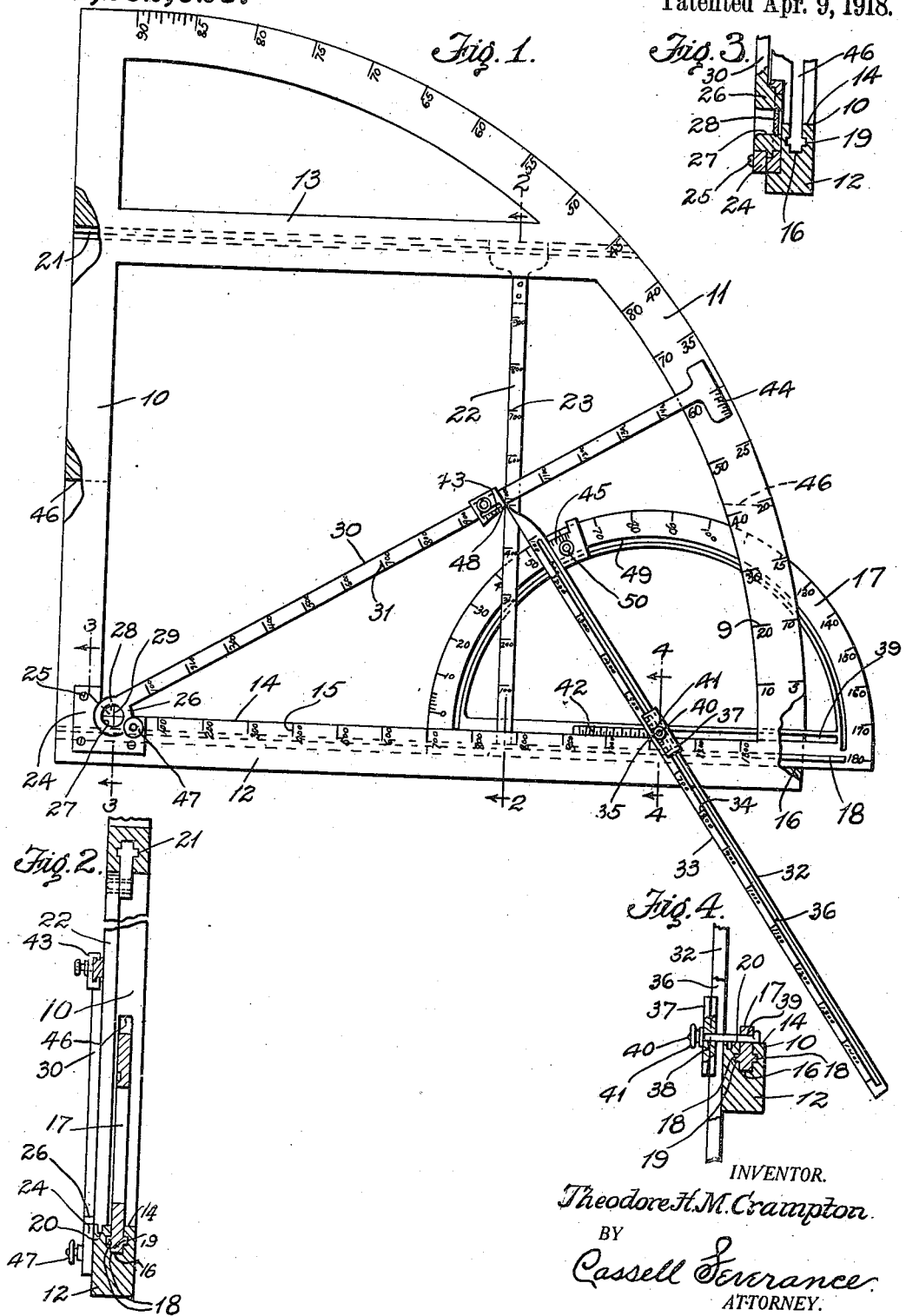
INVENTOR.
Theodore H. M. Crampton
BY
Cassell Severance
ATTORNEY.

UNITED STATES PATENT OFFICE.

THEODORE H. M. CRAMPTON, OF SANTA MONICA, CALIFORNIA.

TRIANGLE COMPUTING AND DRAFTING INSTRUMENT.

1,262,023.

Specification of Letters Patent.  Patented Apr. 9, 1918.

Application filed July 5, 1917.  Serial No. 178,815.

*To all whom it may concern:*

Be it known that I, THEODORE H. M. CRAMPTON, a citizen of the United States, residing at Santa Monica, in the county of Los Angeles and State of California, have invented certain new and useful Improvements in Triangle Computing and Drafting Instruments, of which the following is a specification.

This invention relates to improvements in triangle computing and drafting instruments, and especially to that class of instruments designed to be used upon the drafting board for solving all plane trigonometrical problems without the use of natural functions, logarithms, or other aids.

One of the principal objects of this invention is to provide an instrument which is simple and accurate, and which can be rapidly manipulated by engineers, navigators and military men for determining any or all of the sides and angles of a triangle at one setting; for determining the course of travel of a ship or other moving object; for ascertaining the height of an aeroplane, or the distance of an object from points of observation; and by means of which, when known observations are given, the instrument can be quickly adjusted for making the necessary calculations and determining the unknown elements, the results being indicated directly on the instrument.

Another object of the invention is to provide an instrument of the character referred to having protractors and scale arms so constructed and arranged that the parts thereof can be quickly and accurately adjusted relative to each other for the purpose of reproducing any triangle, together with means for accurately indicating all the sides and angles of the reproduced triangle, and at the same time providing such an instrument as can be used for laying out upon a drawing board the angles and distances indicated.

Another object of the invention is to provide in an instrument of the character referred to means whereby parallel lines may be produced without the necessity of using a protractor.

In order to describe my invention, I have illustrated one practical embodiment thereof on the accompanying sheet of drawings, which I will now describe.

Figure 1 is a plan view of the instrument, certain parts being broken away and shown in section;

Fig. 2 is a cross sectional view taken on line 2—2 of Fig. 1;

Fig. 3 is a cross sectional view taken on line 3—3 of Fig. 1;

Fig. 4 is a cross sectional view taken on the line 4—4, Fig. 1.

The device forming the subject matter of this invention is designed to afford means by which mathematical problems particularly relating to trigonometry can be solved without the use of tables, or other aids. Referring now more particularly to the drawings, the invention as here embodied, comprises a frame 10, preferably in the form of a protractor 11, one side of which is designated as a base member 12, said frame being also provided with a cross member 13. The upper edge 14 of the base member 12 is provided with graduations, and is used as the base line of the protractor. The base member 12 is provided with a guideway, as 16, extending the length thereof. Slidably and detachably mounted on the base member 12 is a secondary protractor 17, provided with a bead 18, formed thereon near the lower edge thereof, and which interfits with the recess 19, formed in the base member 12, as clearly indicated in Fig. 2 of the drawing. The secondary protractor is mounted to be moved along the base member 12, and within the arc thereof, and to this end is smaller.

The frame 10 is also provided with a pair of parallel guideways 20 and 21, formed, respectively, in the base member 12, above the guideway 16, and in the cross member 13. Slidably mounted in these two guideways are the ends of a bar 22, which is adapted to slide laterally from side to side. The upper surface of the bar 22 is provided with graduations, as 23, similar to those on the base member 12.

Detachably secured to the lower left hand corner of the protractor 11, is a two part bearing member 24, which is held in said frame by means of screws 25. Mounted in this member is a hub 26, which is preferably formed with an opening 27 therein. Mounted in this opening is a transparent cross line member 28 so positioned that the point of intersection of said cross lines 20 coincide with the upper edge of the base line 14. Attached to the hub 26 is a scale arm 30, adapted to swing over the protractor 11. The working edge of said scale arm has a scale, 31, inscribed thereon, which is also in the same proportions as the scales 15 and 23. It will be observed that the location of the edges of the scale bars or arms are all adjacent to each other, whereby a triangle which may be drawn or measured by said arms will have the length of its sides read directly from said scales.

The secondary protractor is also provided with a scale bar 32, which may be used for the drafting or measuring of angles, and the working edge 33, thereof, which has a scale 34 inscribed thereon, intersects the center 35 of the protractor 17. This bar, as here shown, is constructed with a slot 36 formed therein for its length. Slidably mounted in said slot is a vernier piece 37, which has an opening 38 formed therethrough, in register with the slot 39, formed in the secondary protractor, whereby a bolt 40 is closely fitted therein and provided with a thumb nut 41, for securing the scale bar 32 in adjusted positions, as desired.

The bar 22 is used for drawing or measuring vertical lines and also the altitudes of triangles, while the other bars or arms, as 30 and 32, and the base line 14, are used to measure and indicate the sides of triangles at one setting of the said parts. At all points where accurate and careful readings are necessary, I prefer to provide verniers, as 42, 43, 44 and 45.

The frame 10 is also provided with a slot, 46, adapted to permit the secondary protractor to slide the entire width of the frame, whereby its center 35 can be moved along the base line 14 for its length. The said protractor may be detached from the frame, if desired. A lock nut 47 is provided upon the carrying member 24, for holding the scale arm 30 at any angle or position of adjustment upon the protractor 11. It will also be observed that the members 30 and 32 are mounted in the same plane, above the frame 12, and the bar 22. The vernier 45 is adapted to move in a slot 49, in the protractor 17, and is held in any position desired by a thumb screw 50. Inscribed upon the inner edge of the protractor 11 is a grade scale 9, which permits an operator of the instrument to read directly from said scale the grade of any elevation laid out upon the angle formed between the base line 14, and the scale arm 30. This scale is so proportioned that the percentage of grade indicated thereby can be read directly therefrom.

The many uses to which this instrument can be put will be readily recognized by those skilled in the art to which it appertains. It will also be understood that many changes can be made in the details of construction and arrangement as here shown for purposes of illustration, without departing from the spirit of the invention, and I do not, therefore, limit the invention to this showing, except as I may be limited by the hereto appended claims.

I claim:

1. An instrument of the character referred to comprising in combination, a protractor having a base member, and a secondary protractor slidably mounted on said base member, within the arc of said first protractor, the centers of said protractors being in alinement with the working edge of the base member.

2. An instrument of the character referred to comprising in combination a protractor having a base member, the upper edge of said base member being the base line of said protractor and intersecting the center of said protractor, a secondary protractor slidably mounted on said base member within the arc of said first protractor, and having its center on said base line, and scale arms movably mounted on said protractors.

3. An instrument of the character described comprising in combination, a base member, the upper edge of said base member having a scale thereon, a protractor on said base member, the center thereof coinciding with said upper edge of said base member, a second protractor slidably mounted on said base member, within the arc of said first protractor, and rotatable arms carried by said protractors, the adjacent edges of said arms having scales thereon.

4. An instrument of the character referred to comprising in combination, a base member, the upper edge of said base member having a scale thereon, a protractor on said base member, the center thereof coinciding with said upper edge of said base member, a second protractor slidably mounted on said base member, within the arc of said first protractor, rotatable arms carried by said protractors, the adjacent edges of said arms having scales thereon, and an arm movable on and perpendicular to said base member and having a scale thereon.

5. An instrument of the character referred to comprising a frame having a protractor scale formed thereon and also having a base, a protractor slidably mounted on said frame, swinging scale arms mounted on said protractor and frame, the working edges of said scale arms, when extended, intersecting the centers of said protractor and protractor scale, and a scale bar perpendicular to the base of said frame and movably mounted on said frame.

6. In an instrument of the character referred to, two protractors, one being slidably mounted within the other, swinging scale bars operating in conjunction with said protractors, a laterally movable scale bar adapted to be moved within the field of said swinging bars, verniers for said scale bars, and means for holding said bars in adjusted positions with respect to said protractors.

7. An instrument comprising a frame having two sides at right angles to each other and having a protractor scale thereon, a scale arm pivotally connected to the corner of said frame to swing over said protractor scale and having cross hairs to indicate the center of its pivot and of said protractor scale, a protractor movably mounted on one of said sides, a scale arm slidably mounted on said protractor at the center thereof, and a scale bar slidably mounted on said side and at right angles thereto.

8. An instrument comprising a frame having a base and having a protractor scale thereon, a scale arm pivotally connected to said base to swing over said protractor scale, a second protractor movably mounted on said base within the arc of said first protractor scale, a scale arm slidably mounted on said second protractor at the center thereof, and a scale bar slidably mounted on said base and at right angles thereto.

9. An instrument comprising a frame having a base and having a protractor scale thereon, a scale arm pivotally connected to said base to swing over said protractor scale and having cross hairs to indicate the center of its pivot and of said protractor scale, a protractor movably mounted on said base, a scale arm slidably mounted on said protractor at the center thereof, and a scale bar slidably mounted on said base and at right angles thereto.

10. In an instrument of the character referred to, a protractor having a base and a graduated arc, a scale arm pivotally mounted thereon to swing over said graduated arc, a second protractor slidably mounted and adapted to be moved within the arc of said first protractor, a scale arm swingingly and slidably mounted on said second protractor, and a scale bar movably mounted at right angles to the base of said first protractor, substantially as described.

In testimony whereof, I have hereunto set my hand.

THEODORE H. M. CRAMPTON.

Copies of this patent may be obtained for five cents each, by addressing the "Commissioner of Patents, Washington, D. C."